(12) United States Patent
Koyanaka et al.

(10) Patent No.: US 9,586,836 B2
(45) Date of Patent: Mar. 7, 2017

(54) METHODS FOR SYNTHESIZING NANOMETER-SIZED MANGANESE DIOXIDES HAVING RAMSDELLITE-TYPE CRYSTAL STRUCTURES AS WELL AS METHODS FOR PRODUCING HYDROXIDE ION-DERIVED PROTON, ELECTRON AND OXYGEN USING MANGANESE DIOXIDES

(75) Inventors: Hideki Koyanaka, Kyoto (JP); Masahiko Tsujimoto, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 1198 days.

(21) Appl. No.: 13/637,499

(22) PCT Filed: Mar. 25, 2011

(86) PCT No.: PCT/JP2011/057471
§ 371 (c)(1),
(2), (4) Date: Nov. 28, 2012

(87) PCT Pub. No.: WO2011/118816
PCT Pub. Date: Sep. 29, 2011

(65) Prior Publication Data
US 2013/0064972 A1 Mar. 14, 2013

(30) Foreign Application Priority Data
Mar. 26, 2010 (JP) ................................. 2010-073823

(51) Int. Cl.
*C01G 45/02* (2006.01)
*C01B 13/02* (2006.01)
(Continued)

(52) U.S. Cl.
CPC .............. *C01G 45/02* (2013.01); *B82Y 30/00* (2013.01); *C01B 13/0207* (2013.01);
(Continued)

(58) Field of Classification Search
CPC combination set(s) only.
See application file for complete search history.

(56) References Cited

U.S. PATENT DOCUMENTS

| 5,532,084 A | * 7/1996 | Wang | C01G 45/02 |
| | | | 423/605 |
| 2010/0196746 A1 | 8/2010 | Koyanaka | |

FOREIGN PATENT DOCUMENTS

| JP | 2007-090342 | 4/2007 |
| JP | 2007-238424 | 9/2007 |
| | (Continued) | |

OTHER PUBLICATIONS

International Search Report issued Jun. 28, 2011 in International (PCT) Application No. PCT/JP2011/057471, of which the present application is the national stage.
(Continued)

*Primary Examiner* — Duy Deo
*Assistant Examiner* — Erin Bergner
(74) *Attorney, Agent, or Firm* — Wenderoth, Lind & Ponack, L.L.P.

(57) ABSTRACT

By means of a series of wet multistage oxidation process comprising: Step 1 for adding an alkaline reagent to an aqueous solution of a manganese compound containing a divalent manganese thereby precipitating a manganese hydroxide; Step 2 for adding an aqueous hydrogen peroxide while keeping the temperature of the water of the aqueous solution comprising the manganese hydroxide at room temperature thereby converting into a manganese oxide; and also Step 3 for adding a dilute acid to the manganese oxide in a state where the water is coexisting, a nanometer-sized manganese dioxide having a ramsdellite-type crystal structure is obtained.

17 Claims, 12 Drawing Sheets

(51) Int. Cl.
- *C23C 18/16* (2006.01)
- *C23C 18/54* (2006.01)
- *B82Y 30/00* (2011.01)

(52) U.S. Cl.
CPC ...... *C23C 18/1635* (2013.01); *C23C 18/1637* (2013.01); *C23C 18/54* (2013.01); *C01P 2002/72* (2013.01); *C01P 2004/04* (2013.01); *C01P 2004/16* (2013.01); *C01P 2004/64* (2013.01)

(56) References Cited

FOREIGN PATENT DOCUMENTS

| JP | 2008-200609 | 9/2008 | | |
|----|-------------|--------|---|---|
| JP | 2009-106924 | 5/2009 | | |
| JP | 2009-289616 | 12/2009 | | |
| WO | 2008/023597 | 2/2008 | | |
| WO | WO2008/123256 | * 10/2008 | ............ | C01G 45/02 |

OTHER PUBLICATIONS

M. Tsujimoto et al., "Solid oxide fuel cell operated at room temperature by applying water-oxidation property of R-type manganese dioxide", Abstracts, the $48^{th}$ Battery Symposium in Japan, Nov. 13, 2007, pp. 596-597.

* cited by examiner (a)

(b)

METHODS FOR SYNTHESIZING NANOMETER-SIZED MANGANESE DIOXIDES HAVING RAMSDELLITE-TYPE CRYSTAL STRUCTURES AS WELL AS METHODS FOR PRODUCING HYDROXIDE ION-DERIVED PROTON, ELECTRON AND OXYGEN USING MANGANESE DIOXIDES

TECHNICAL FIELD

The present invention relates to a method for synthesizing a nanometer-sized manganese dioxide having a ramsdellite-type crystal structure as well as a method for producing hydroxide ion-derived proton, electron and oxygen using this manganese dioxide.

BACKGROUND ART

A manganese oxide (composition formula: $MnO_2$) can exist in an alpha, beta, epsilon, gamma, delta, R and lambda-type crystal structures, and has a property which differs physically or chemically depending on the relevant crystal structures. Among these, the R-type is referred to as a ramsdellite-type crystal structure, and has a structure referred crystallographically to as an ortholombic type. Since a manganese dioxide having this ramsdellite-type crystal structure adsorbs a metal complex ion or palladium complex ion in a water, it is an effective functional material for resource recovery and catalyst synthesis (see, for example, Patent Literatures 1, 2 and 3).

CITATION LIST

Patent Literatures

Patent Literature 1: Publication of unexamined Japanese Patent Application No. 2005-263651.
Patent Literature 2: Publication of unexamined Japanese Patent Application No. 2009-106924.
Patent Literature 3: Publication of unexamined Japanese Patent Application No. 2007-238424

Non-Patent Literatures

Non-Patent Literature 1: Suetsugu, K, et al., TOSOH Research & Technology Review 49, 21-27(2005)

SUMMARY OF THE INVENTION

Problems to be Solved by the Invention

Nevertheless, the methods for synthesizing manganese dioxides having ramsdellite-type crystal structures reported in Patent Literatures 1 and 2 require the sintering and the acid treatment of the manganese carbonate powders in which solid powders and acidic liquids are required to be handled, although highly reactive nanoparticles can be obtained. Accordingly, an industrial large-scale synthesis of a manganese dioxide having a ramsdellite-type structure involves a problem relating to the cost. While it was also demonstrated that a manganese dioxide having a ramsdellite-type structure has a function to adsorb a metal complex ion or a palladium complex ion in a water as described above, no basal reaction is known clearly to give such a function.

On the other hand, the synthetic method reported in Non-Patent Literature 1 is a method employing a common electrolytic precipitation which requires a period as long as 17 days for synthesizing a manganese dioxide having a ramsdellite-type structure at a high purity and in which solid powders and acidic liquids are required to be handled as the above methods reported in Patent Literatures 1 and 2. Such a requirement each poses a problem relating to the manufacture efficiency.

Accordingly, an object of the present invention, in view of the aforementioned problems associated with the prior art, is to provide a method for synthesizing a manganese dioxide having a ramsdellite-type structure industrially at a low cost on a large scale as well as a method for producing hydroxide ion-derived proton, electron and oxygen utilizing a basal reaction for adsorbing and recovering a gold complex ion or a palladium ion from a water using the aforementioned manganese dioxide.

Means for Solving the Problems

The present invention has the following aspects.

The method for synthesizing a manganese dioxide of the present invention comprises a series of wet multistage oxidation process comprising: Step 1 for adding an alkaline reagent to an aqueous solution of a manganese compound containing a divalent manganese thereby precipitating a manganese hydroxide; Step 2 for adding an aqueous hydrogen peroxide while keeping the temperature of the water of said aqueous solution at room temperature thereby converting said manganese hydroxide into a manganese oxide; and Step 3 for adding a dilute acid to said manganese oxide in a state where the water is coexisting thereby obtaining a nanometer-sized manganese dioxide having a ramsdellite-type crystal structure.

In this method for synthesizing a manganese dioxide, it is preferable that the compound containing the divalent manganese is a manganese chloride or a manganese sulfate.

Also the method for synthesizing a manganese dioxide of the present invention comprises, after completing Step 3, adding an aqueous solution of a manganese compound containing a divalent manganese to said nanometer-sized manganese dioxide and heating.

In this method for synthesizing a manganese dioxide, it is preferable that the aqueous solution of a manganese compound containing a divalent manganese is acidic.

Also in the method for synthesizing a manganese dioxide, it is preferable that the compound containing the divalent manganese is a manganese chloride or a manganese sulfate.

The manganese dioxide of the present invention is a manganese dioxide synthesized by the synthetic method described above, which has a ramsdellite-type crystal structure and is a nanoparticle having a particle size of 1 to 15 nm.

Also the manganese dioxide of the present invention is a manganese dioxide synthesized by any of the synthetic method described above, which has a ramsdellite-type crystal structure and is a particle having a length of 150 nm or more and a width of 20 nm or more.

The method for growing a crystal of a manganese dioxide having a ramsdellite-type crystal structure of the present invention comprises: adding, to a nanometer-sized manganese dioxide having a ramsdellite-type crystal structure, an aqueous solution of a manganese compound containing a divalent manganese and heating thereby allowing for the crystal growth of said manganese dioxide.

In this method for growing a crystal of a manganese dioxide having a ramsdellite-type crystal structure, it is preferable that the aqueous solution of a manganese compound containing a divalent manganese is acidic.

Also in this method for growing a crystal of a manganese dioxide having a ramsdellite-type crystal structure, it is preferable that the compound containing the divalent manganese is a manganese chloride or a manganese sulfate.

The method for producing a hydroxide ion-derived proton of the present invention comprises placing a nanometer-sized manganese dioxide having a ramsdellite-type crystal structure in a water thereby producing a proton from a hydroxide ion contained in the water.

In this method for producing a hydroxide ion-derived proton, it is preferable that the pH of the water is within the range of 4.5 to 10.

The method for charging a hydroxide ion-derived electron of the present invention comprises placing a nanometer-sized manganese dioxide having a ramsdellite-type crystal structure in a water thereby allowing the hydroxide ion-derived electron contained in the water to be charged on the surface of said manganese dioxide.

In this method for charging an electron derived from a hydroxide ion, it is preferable that the pH of the water is within the range of 4.5 to 10.

The method for producing a hydroxide ion-derived oxygen of the present invention comprises placing a nanometer-sized manganese dioxide having a ramsdellite-type crystal structure in a water thereby producing an oxygen gas from a hydroxide ion contained in the water.

In this method for producing a hydroxide ion-derived oxygen, it is preferable that the pH of the water is within the range of 4.5 to 10.

Also the method for recovering a noble metal ion from a water of the present invention is a method for allowing the noble metal ion in an aqueous solution to be deposited as a metal on the surface of a nanometer-sized manganese dioxide having a ramsdellite-type crystal structure thereby recovering the noble metal ion from said aqueous solution, and comprises adjusting the pH of said aqueous solution at pH 4.5 to 10 thereby allowing said noble metal ion to be deposited on the surface of said manganese dioxide.

Advantageous Effects of the Invention

According to the present invention, a nanometer-sized manganese dioxide having a ramsdellite-type structure can be synthesized industrially at a low cost on a large scale. It is also possible to produce a proton, an electron and an oxygen from a hydroxide ion by bringing the aforementioned material into contact with a water. In such a case, the advantageous function of the aforementioned material can maximally be exerted by controlling the pH of the water being brought into contact.

MODES FOR CARRYING OUT THE INVENTION

Figure 1:
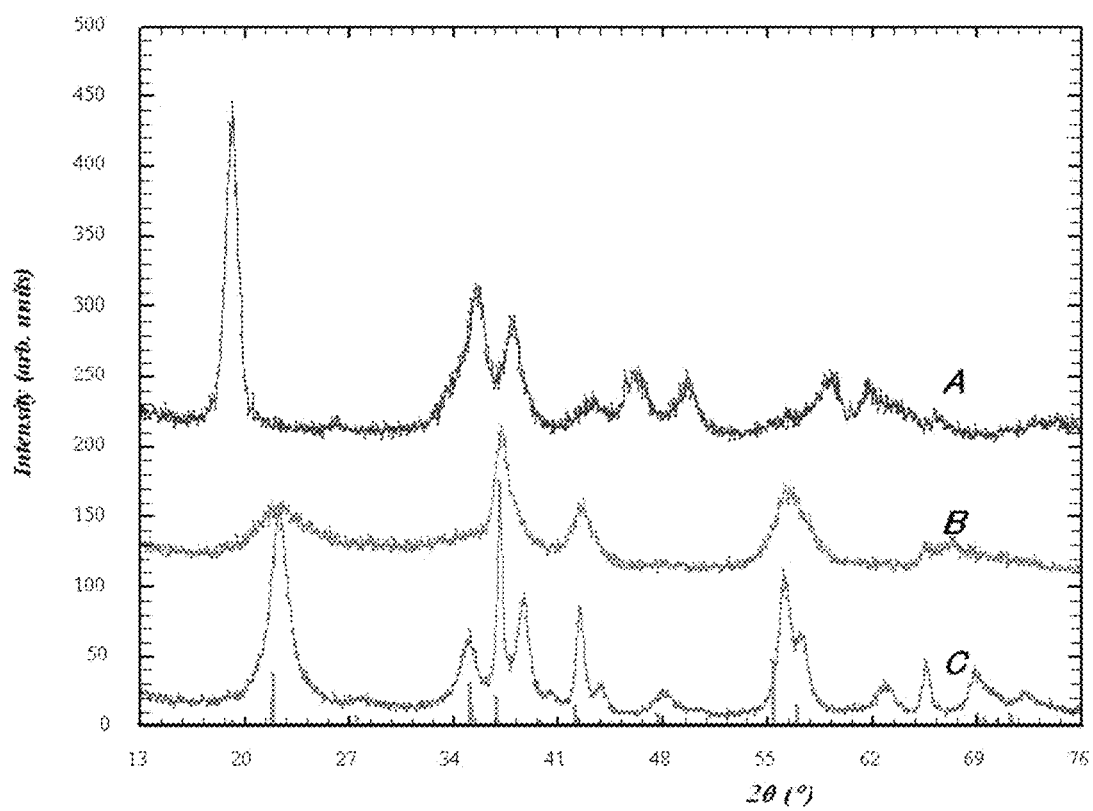
FIG. 1 shows the X-ray diffraction patterns of samples A, B and C obtained in Synthetic Steps 2, 3 and the crystal growth treatment after completion of Synthetic Step 3, respectively, in Example 1.

The embodiments of the present invention in which the manganese dioxides having the ramsdellite-type structures are synthesized are described below.

A manganese dioxide having a ramsdellite-type structure (hereinafter also referred to as an R-type manganese dioxide) is synthesized according to the process described below. First, an aqueous solution of a manganese compound containing a highly water-soluble divalent manganese such as a manganese chloride or manganese sulfate is prepared, and this aqueous solution is combined with an alkaline reagent such as a sodium hydroxide thereby converting a manganese ion into a manganese hydroxide $Mn(OH)_2$. This procedure is referred to as Step 1. The aqueous solution of the manganese compound containing the divalent manganese may for example be an aqueous solution whose manganese ion concentration is 0.05 to 1.0% by weight, preferably 0.08 to 0.2% by weight.

Then, in Step 2, the aqueous solution of the divalent manganese compound supplemented with the alkaline reagent is combined with an aqueous hydrogen peroxide thereby converting the manganese hydroxide into a manganese oxide $Mn_3O_4$ whose manganese valency is 2.67. It is important in Step 2 that the water temperature after addition of the aqueous hydrogen peroxide is kept at room temperature for the purpose of finally obtaining an R-type manganese dioxide. In the present invention, the room temperature used herein is a temperature of 40° C. or lower and the lower limit is 2° C. A preferable water temperature is 2° C. to 25° C., especially 5° C. to 20° C.

Finally, in Step 3, the manganese oxide $Mn_3O_4$ in a state where the water is coexisting is supplemented with a dilute acid (the dilute acid is an aqueous solution of an acid such as a hydrochloric acid, sulfuric acid or nitric acid at a low concentration, such as for example an aqueous solution of an acid at a concentration of 0.1M to 1M), and stirred at room temperature. As a result, a nanometer-sized manganese dioxide having a ramsdellite-type structure is synthesized. As used herein, the nanometer-sized manganese dioxide means a nanoparticle of the manganese dioxide. The nanoparticle means a particle of $10^{-9}$ to $10^{-7}$ meter in size, for example a particle having a particle size of 1 to 100 nm. According to this synthetic method, a manganese dioxide particle whose particle size is small can be synthesized, and, for example, a manganese dioxide particle whose particle size is 1 to 30 nm, especially a manganese dioxide particle whose particle size is 1 to 15 nm can be synthesized. The manganese dioxide thus synthesized is contemplated to be washed for example with a pure water to become free of the acid. Such a washing treatment serves to suppress the growth of the manganese dioxide crystal.

In Step 3, the manganese oxide $Mn_3O_4$ in a state where the water is coexisting may for example be an aqueous solution containing the manganese oxide after conversion of the manganese hydroxide into the manganese oxide by adding the aqueous hydrogen peroxide in Step 2, or a manganese oxide, separated and recovered from this aqueous solution containing the manganese oxide, as a wet paste of $Mn_3O_4$ without conducting any drying treatment.

The aforementioned synthetic method is so-called an aqueous solution synthetic method in which a manganese dioxide having a ramsdellite-type structure is synthesized in the state where a water is coexisting constantly. This aqueous solution synthetic method enables a synthesis of a manganese dioxide without any process, for example, for drying a manganese oxide as a precursor of a manganese dioxide to yield a solid powder. In addition, it can minimize the generation of a waste fluid containing the manganese ion when compared with a conventional electrolytic method (aforementioned Non-Patent Literature 1). As a result, the manganese dioxide can synthesized industrially at a low cost on a large scale.

Also in this synthetic method, after completion of Step 3, the nanometer-sized manganese dioxide obtained in Step 3 is supplemented with an aqueous solution of a manganese compound containing a divalent manganese thereby promoting the crystal growth of the manganese dioxide. Hereinafter this treatment is referred also to as a crystal growth treatment. The aqueous solution of the manganese compound containing the divalent manganese to be brought into contact with the manganese dioxide is an aqueous solution described in the aforementioned Step 1 and is an aqueous solution containing a divalent manganese ion. It is effective here for the purpose of promoting the crystal growth that the pH of the aqueous solution is, for example, less than 3, typically pH1 for being strongly acidic. The effectiveness becomes marked especially when using a sulfuric acid.

In the crystal growth treatment, when the aforementioned aqueous solution is heated for a prolonged period (for example a period exceeding 100 hours) in the state where the aforementioned aqueous solution is added to the manganese dioxide, it is possible that a mixed crystal of manganese oxides having crystal structures other than the R-type crystal structure may occur in the crystal growth product. Accordingly, the heating time period, for promoting the crystal growth of the R-type manganese dioxide is preferably 100 hours or less, typically 10 to 80 hours, especially about 60 hours. The temperature at which the aforementioned aqueous solution is heated is 50° C. or higher, preferably 80° C. or higher, more preferably 90° C. or higher. As a result of such a crystal growth treatment, the manganese dioxide obtained in Step 3 can be grown to a length in the longitudinal axis of 150 nm or more, and a width of 20 nm or more.

For example, a manganese dioxide having a maximum value of the length in the longitudinal axis of about 300 nm and a maximum value of the width of about 30 nm can be obtained.

The structure and the size of the R-type manganese dioxide in this embodiment can be confirmed for example by analyzing an X-ray diffraction pattern using a general laboratory X-ray diffraction analyzer, or by a transmission electron microscopy. The measurement of the valency of the manganese in each synthetic step can be confirmed by analyzing the absorption edge using an X-ray absorption edge analyzer.

The present inventor also discovered that a proton $H^+$, an electron $e^-$ and an oxygen gas $O_2$ can be produced by reacting a nanometer-sized manganese dioxide having a ramsdellite-type structure with a hydroxide ion OH— in a water. This is based on the reaction scheme (1) shown below.

[C.1]

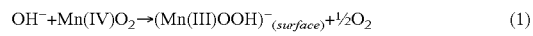
$$OH^- + Mn(IV)O_2 \rightarrow (Mn(III)OOH)^-_{(surface)} + \tfrac{1}{2}O_2 \qquad (1)$$

In the reaction scheme, the subscript "surface" indicates the chemical composition of the surface of the nanometer-sized manganese dioxide having the ramsdellite-type crystal structure.

On the surface of the nanometer-sized manganese dioxide $Mn(IV)O_2$ having the ramsdellite-type structure, the hydroxide ion $OH^-$ is reacted and decomposed. The resultant proton $H^+$ is adsorbed onto the surface of the manganese dioxide $Mn(IV)O_2$. Then one of the two electron $e^-$s is received by the manganese atom on the surface which is a constituent of the manganese dioxide to make the valency of the manganese trivalent. The other electron serves to charge the interface potential negatively on the surface of the manganese dioxide. As a result, $(Mn(III)OOH)^-_{(surface)}$ is constituted. Also along with this reaction, an oxygen gas is emitted. For a better understanding of the reaction of the reaction scheme (1), the manganese oxides are deleted from the both sides of the equation, the proton $H^+$, the electron $e^-$ and the oxygen $O_2$ are generated from the hydroxide ion in the water according to the following scheme (2).

[C.2]

$$OH^- \rightarrow H^+ + 2e^- + \tfrac{1}{2}O_2 \qquad (2)$$

Generally, a hydroxide ion in a water remains as being dissolved at a high concentration within the range from a weakly acidic pH to an alkaline pH. When a nanometer-sized manganese dioxide having the ramsdellite-type structure is utilized to effect a function by which a noble metal ion such as a gold ion in the water is deposited and recovered as the metal on the surface thereof, or by which a palladium complex ion is deposited and recovered as the metal on the surface thereof, it is effective in principle to control the pH of the water within the weakly acidic pH to an alkaline pH at which the reactions of the schemes (1) and (2) take place actively. Such a pH range may for example be pH4.5 to 10, preferably pH4.8 to 9. Since a pH exceeding 10 allows the manganese dioxide itself to begin to dissolve, it is not preferable to apply to an alkaline aqueous solution exceeding pH10.

The following Examples are presented for a further detailed description. It is a matter of course that the present invention is not limited to the following examples.

EXAMPLES

Example 1

Method for Synthesizing R-Type Manganese Oxide Nanoparticle by Aqueous Solution Synthetic Method Using Manganese Chloride as Starting Material Using a manganese chloride as a starting material, the following 3 steps were conducted to synthesize an R-type manganese dioxide nanoparticle by an aqueous solution method. 26.7 g of a manganese chloride $MnCl_2.4H_2O$ (99%, special grade reagent from Wako Pure Chemical Industries, Ltd.) as a starting material was dissolved in 225 ml of an ion exchange water in a beaker.

In Step 1, this aqueous solution of the manganese chloride (pH4.6) was combined with 90 mL of the ion exchange water in which 10.8 g of a sodium hydroxide NaOH (99%, special grade reagent from Wako Pure Chemical Industries, Ltd.), and stirred using a magnetic stirrer. The manganese chloride changed immediately upon this sodium hydroxide addition into an opaque compound (manganese hydroxide $Mn(OH)_2$). The pH at this time was about 12.

Thereafter in Step 2, 54 mL of an aqueous hydrogen peroxide (30% from Wako Pure Chemical Industries, Ltd.) was added dropwise and the stirring was continued, and the opaque compound was changed into a brown tan compound. At this time, by cooling the circumference of the beaker as a reaction contained using an ice water the heat generation due to the hydrogen peroxide addition was suppressed, and the temperature of the reaction solution containing the brown tan compound was kept at 25° C. or lower. The final pH of the reaction solution was about 7.5. After this procedure, the brown tan compound in the reaction solution was subjected to a 0.2 μm mesh-sized glass filter paper (Advantec Co., Ltd., GS-25) with a filter under reduced pressure thereby recovering the brown tan compound on the glass filter paper. The compound thus recovered on the filter paper was suspended in 500 mL of the ion exchanged pure water and stirred for 1 hour using a Teflon (Trade Mark) magnetic stirrer for washing to obtain Sample A.

Thereafter in Step 3, Sample A was suspended in 1 L of a dilute hydrochloric acid at a concentration of 0.5M and stirred for 8 hours, and then recovered by filtration, and washed for 1 hour in 500 mL of the ion exchanged pure water to obtain Sample B.

Furthermore after completion of Step 3, a crystal growth treatment was conducted in which a suitable amount of this Sample B was suspended in 100 mL of a solution obtained by dissolving 18 g of a manganese chloride in 500 mL of a dilute hydrochloric acid at a concentration of 0.5M and placed in a 100-mL conical flask having a closure, which was kept at 90° C. for 12 hours as being closed tightly. Thereafter, the conical flask was allowed to cool to room temperature, and Sample B was recovered by filtration, washed by stirring for 1 hour in 1 L of the ion exchanged pure water, and then dried for 12 hours at 110° C. under atmospheric pressure to obtain Sample C. The particle size of Sample B was about 10 nm, while Sample C particle had a length of 150 nm or more and a width of 20 nm or more.

FIG. 1 shows the results of the analysis of the crystal structure using a powder X-ray diffraction analyzer (Rigaku Corporation, Model RINT-2000, CuKα). As a result, it was confirmed that Sample A obtained in Step 2 was a manganese oxide $Mn_3O_4$. While the pattern of Sample B obtained in Step 3 showed broad peaks because of which the identification of the crystal structure in detail was difficult, Sample B was confirmed to be a manganese dioxide having a ramsdellite crystal structure based on the results of the analysis employing an atomic pair distribution function method (S. Iikubo, H. Koyanaka, S. Shamoto, K. Takeuchi, S. Kohara, K. Kodama, C-K. Loong Local crystal structure of nano-manganese-oxide gold adsorbent, J. Physics and Chemistry of Solids, Vol. 71, pp. 1603-1608 (2010)).

Also since the pattern of Sample C obtained by keeping at 90° C. in the dilute hydrochloric acid after completion of Step 3 was in agreement with the R-type crystal structure peaks shown on the abscissa of FIG. 1, it was proven that a manganese dioxide having a ramsdellite-type structure was obtained by this aqueous solution synthetic method.

Figure 2:
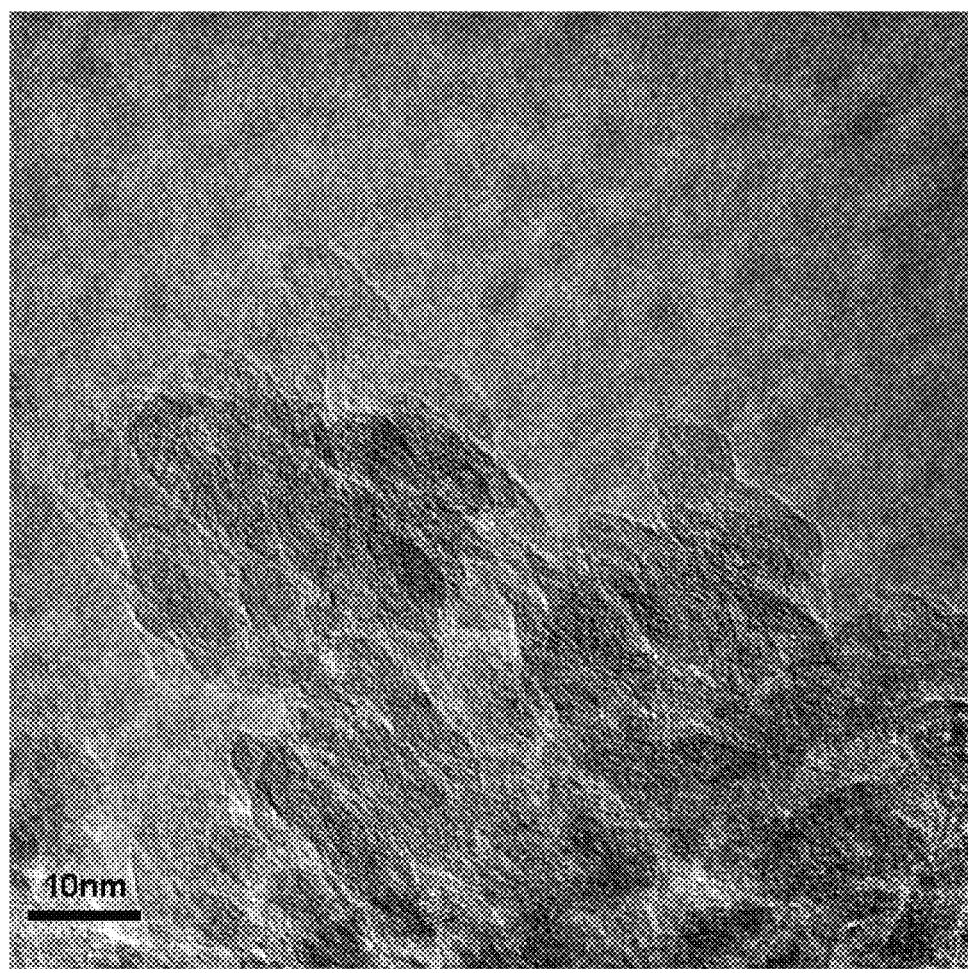
FIG. 2 shows a transmission electron microscopic photograph of Sample B obtained in Example 1.
Figure 3:
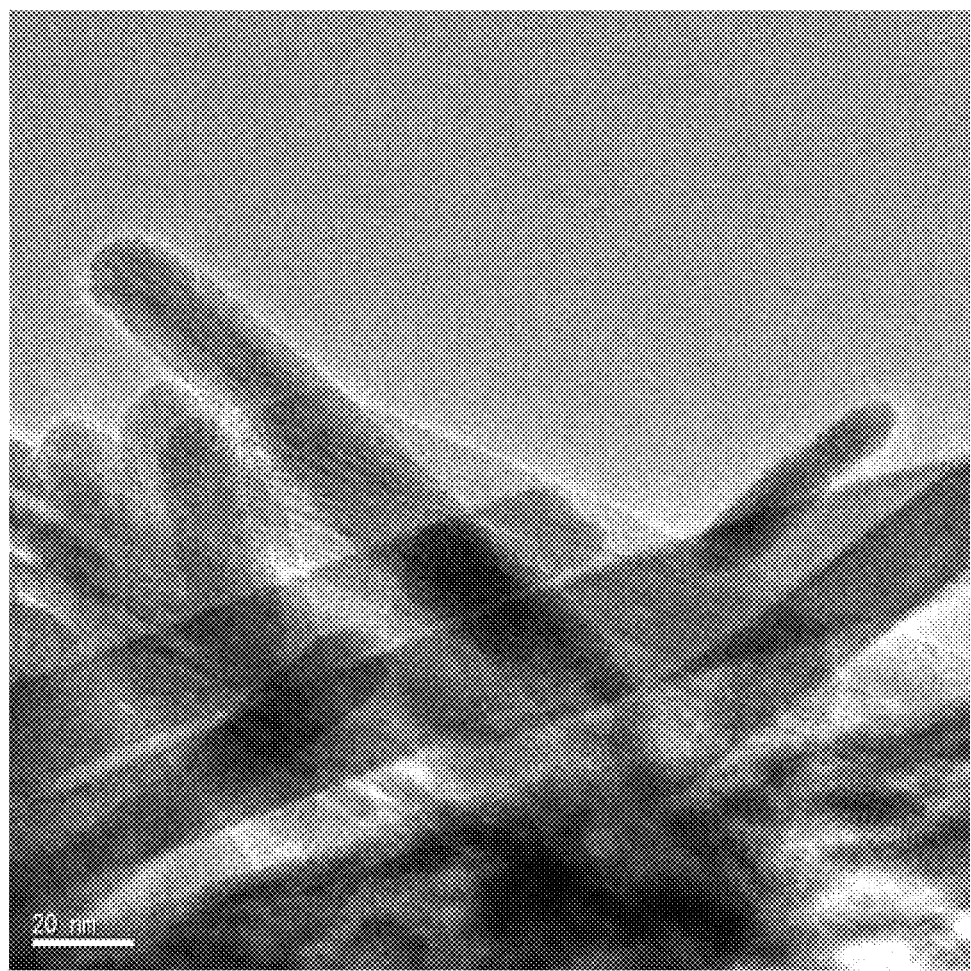
FIG. 3 shows a transmission electron microscopic photograph of Sample C obtained in Example 1.

FIG. 2 shows the transmission electron microscopic photograph of Sample B and FIG. 3 shows the transmission electron microscopic photograph of Sample C. FIG. 2 confirms that Sample B had a particle size of about 10 nm, and FIG. 3 confirms that Sample C particle had a length of 150 nm or more and a width of 20 nm or more.

Figure 4:
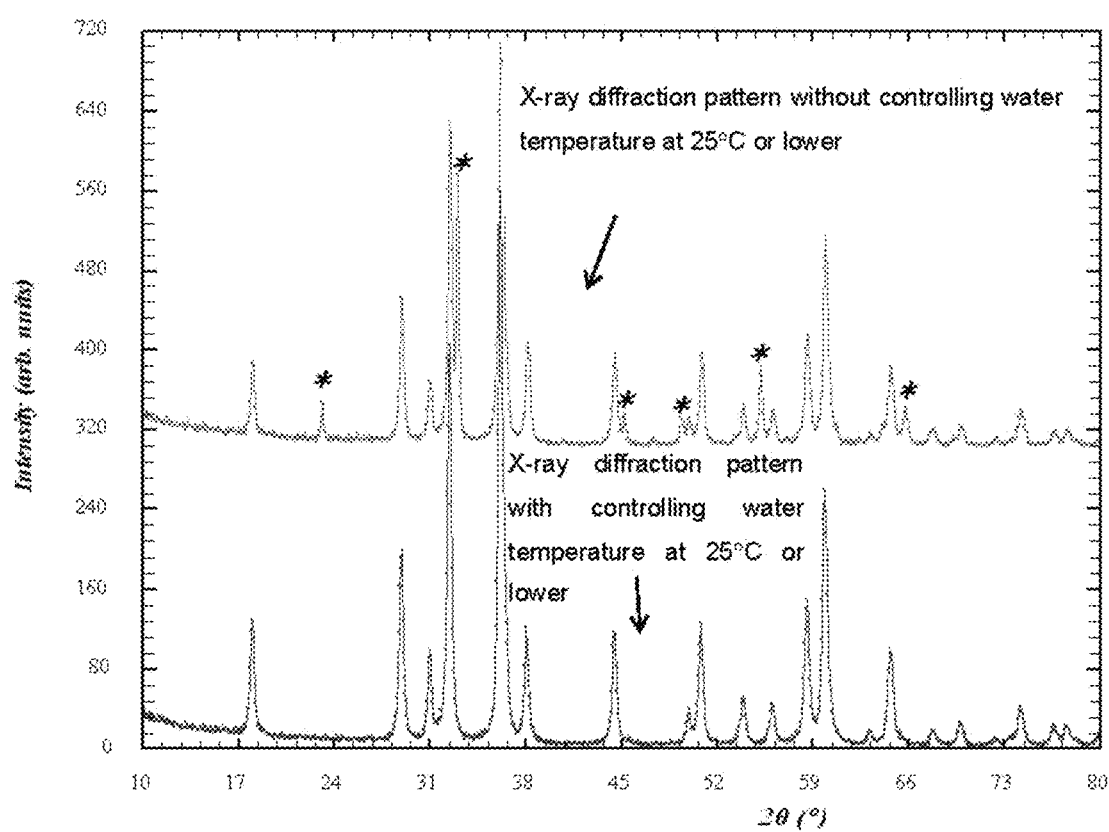
FIG. 4 shows the X-ray diffraction patterns of the samples obtained in Synthetic Step 2 in Example 1 at the water temperature which was controlled at 25° C. or lower (bottom) and which was not controlled at 25° C. or lower (top).

In Step 2 described above, when the synthesis was continued at 30° C. or higher without controlling the water temperature at 25° C. or lower, the peaks marked with *, which reflected the existence of a manganese oxide $Mn_2O_3$ of another species, appeared as being mixed with the peaks of $Mn_3O_4$. When controlling the water temperature at 25° C. or lower (pattern on bottom of FIG. 4), only the peaks of $Mn_3O_4$ were observed, and there is no adverse effect on the purity of the manganese dioxide having a ramsdellite-type structure obtained in the subsequent Step 3.

Figure 5:
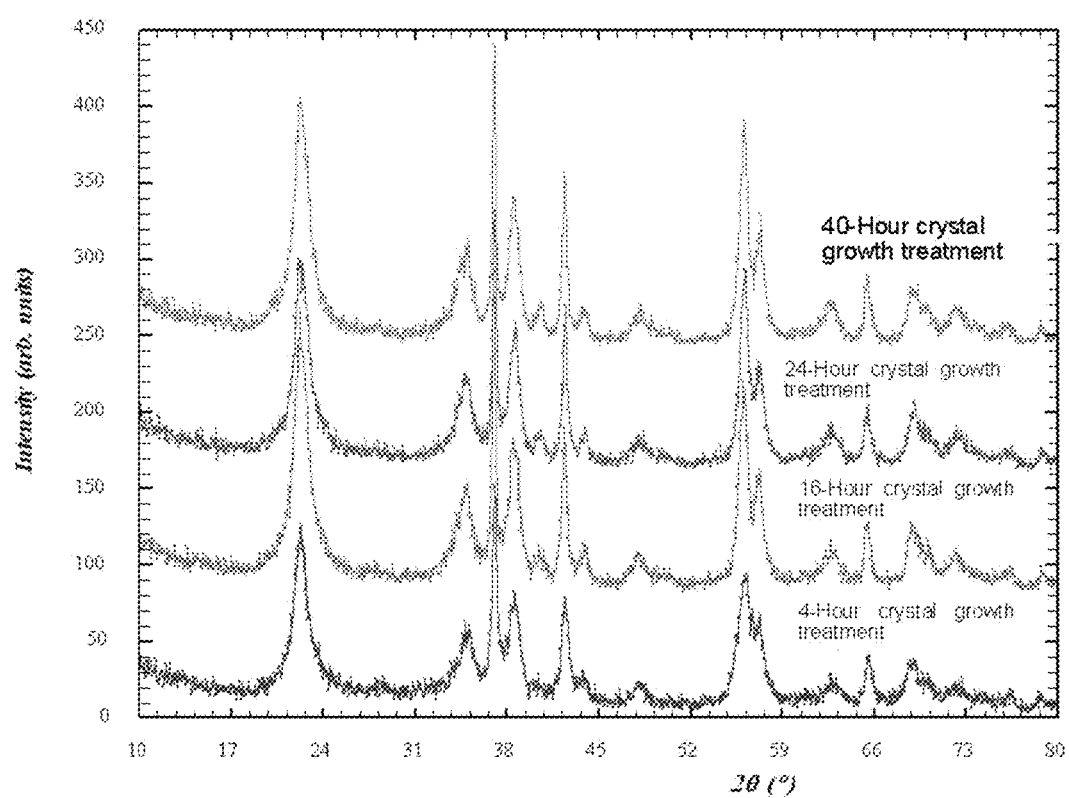
FIG. 5 shows the X-ray diffraction pattern of the sample obtained when the time period of heating at 90° C. was varied from 4 hours to 40 hours in the crystal growth treatment after completion of Synthetic Step 3 in Example 1.
Figure 6:
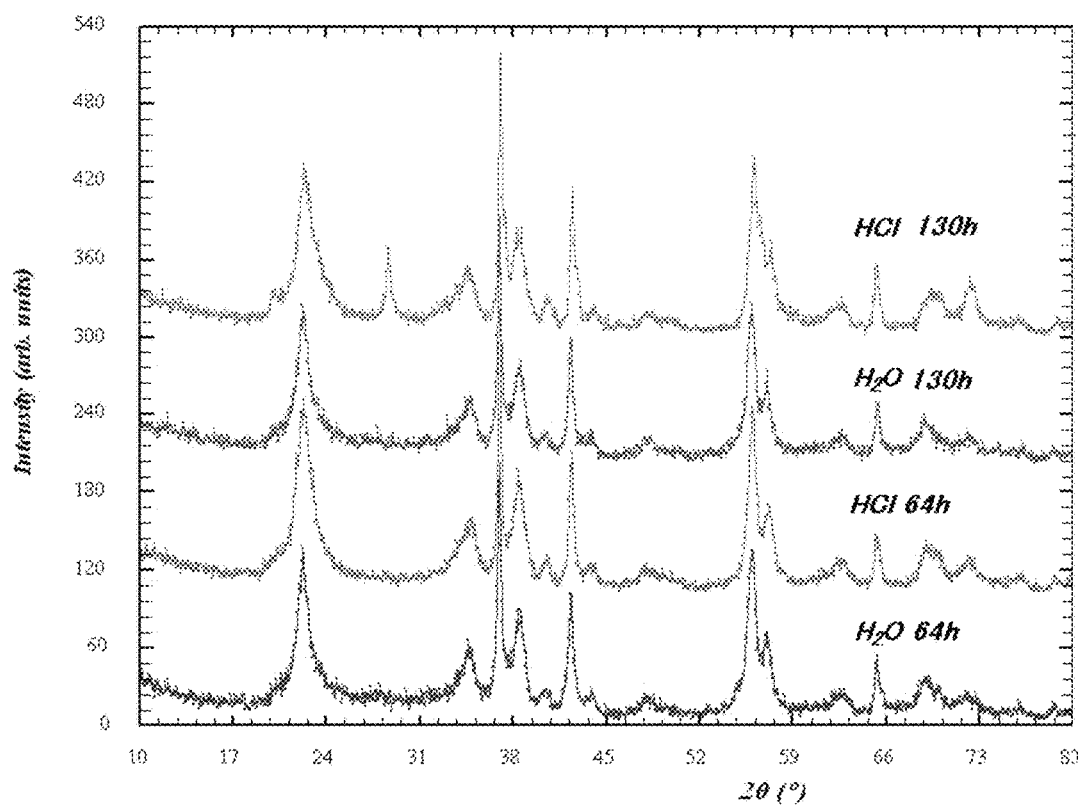
FIG. 6 shows the X-ray diffraction pattern of the sample obtained when using a manganese chloride as a starting material and also using a water or a dilute hydrochloric acid in the crystal growth treatment after completion of Synthetic Step 3 in Example 1.

Also in FIG. 5, the effects of the heating time during the crystal growth treatment after completion of the synthesis Step 3 on the crystal growth and the purity of the manganese dioxide having a ramsdellite-type structure obtained finally are indicated. This figure shows the X-ray diffraction pattern obtained by heating the dilute hydrochloric acid for 4 hours, 16 hours, 24 hours and 40 hours at 90° C. instead of keeping the dilute hydrochloric acid for 12 hours at 90° C. during the aforementioned crystal growth treatment. The crystal is grown along with the increased time period of the heating. When heating for 16 hours, 24 hours and 40 hours, the crystal was grown slightly when compared with Sample C in FIG. 1, as reflected by the respective peak intensities and the peak sharpness in the X-ray diffraction pattern. Nevertheless, as shown in FIG. 6, when the dilute hydrochloric acid was used in the crystal growth treatment with heating at 90° C. for 130 hours (pattern on top of figure), there were peaks between 24° to 31° which were not observed with a ramsdellite type. Thus, it was found that the heating treatment for a period exceeding 100 hours had an adverse effect on the purity of the ramsdellite-type manganese dioxide obtained finally. FIG. 6 also shows the X-ray diffraction patterns obtained when the crystal growth treatment was conducted employing the dilute hydrochloric acid with heating at 90° C. for 64 hours and employing the water with heating at 90° C. for 130 hours and 64 hours. Based on the results shown in FIG. 5 and FIG. 6, the heating time period which is optimum for promoting the crystal growth under this condition is less than 100 hours.

Example 2

Method for Synthesizing R-Type Manganese Oxide Nanoparticle by Aqueous Solution Synthetic Method Using Manganese Sulfate as Starting Material 32.51 g of a manganese sulfate $MnSO_4.5H_2O$ (99%, special grade reagent from Wako Pure Chemical Industries, Ltd.) employed as a starting material instead of the manganese chloride in Example 1 was dissolved in 225 mL of the ion exchange pure water in a beaker. The subsequent treatments and the amounts of the reagents in respective steps were similar to those in Example 1, except for using a dilute sulfuric acid at a concentration of 0.25M during the acid treatment in Step 3. Finally, the compound obtained after completion of Step 3 was recovered by filtration and 1.6 g aliquots were dispensed into 3 volumetric flasks having closures and suspended in 100 mL of the ion exchange pure water in which the manganese sulfate was dissolved at a manganese ion concentration of 0.1% by weight, and kept under this condition at 90° C. for 48 hours, thereby promoting the crystal growth. Here the pHs of the suspensions in the respective volumetric flasks having closures were adjusted at 5.2, 3 and 1. This adjustment employed the sulfuric acid. Thereafter, the temperature was allowed to be lowered to room temperature, and then the compound was recovered by filtration and the X-ray diffraction pattern was measured. The results are shown in FIG. 7.

Figure 7:
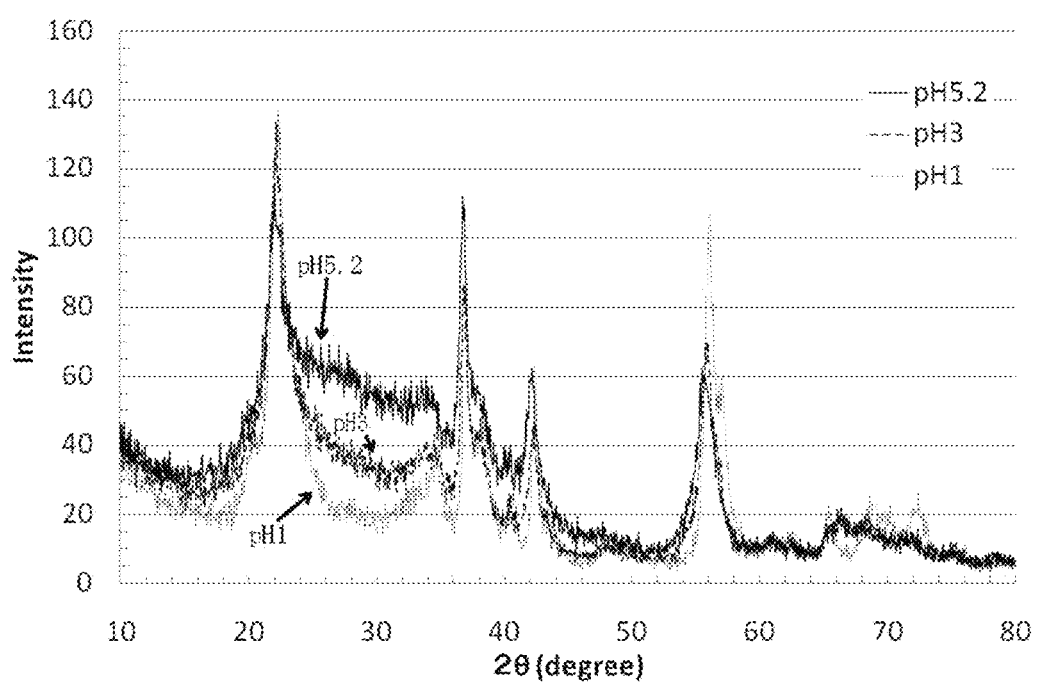
FIG. 7 shows the X-ray diffraction pattern of the sample obtained when using a manganese sulfate as a starting material and also using a dilute sulfuric acid in Synthetic Step 3, and in the crystal growth treatment after completion of Synthetic Step 3 using different concentration of sulfuric acids in Example 2.

Based on FIG. 7, it was confirmed that the compound obtained by adjusting the pH at 1 did not exhibit broad peaks possibly resulting from a mixed crystal of those crystal structures other than the R-type over the diffraction angles from 24° to 32° when compared with the compounds obtained by adjusting the pH at 5.2 or 3. Accordingly, it was revealed that for the ramsdellite-type manganese dioxide crystal growth when using the sulfuric acid it is effective to conduct the heating in a manganese ion aqueous solution which was as highly acidic as pH1.

The particle size of the compound obtained in this Example with adjusting the pH at 1 was 1 to 30 nm.

Example 3

Figure 8:
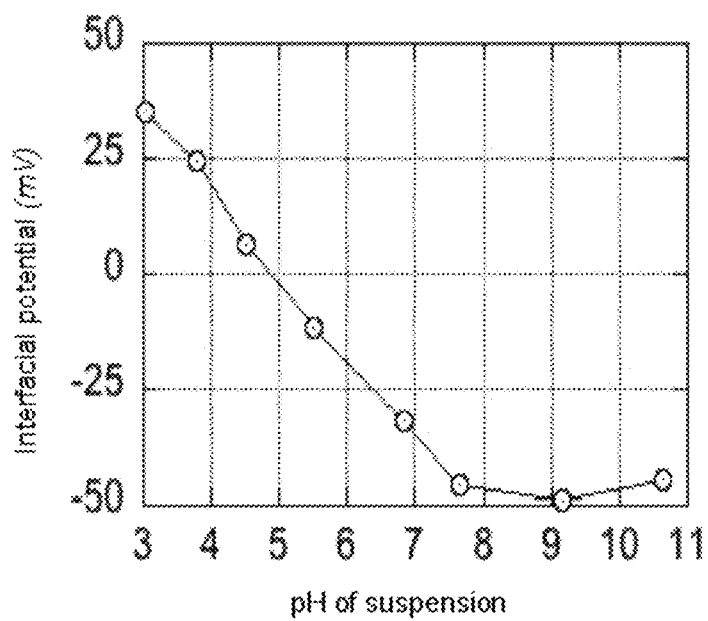
FIG. 8 shows a interfacial (zeta) potential profile of the R-type manganese dioxide in Example 3.

Confirmation of Optimum Condition for Exerting Reactivity with Water and Functions Possessed by Ramsdellite-Type Manganese Dioxide Nanoparticle FIG. 8 shows the results of the measurement of the change in the inter-facial potential (zeta potential) in response to the change in the pH of the ramsdellite-type manganese dioxide nanoparticle measured by a microscopic electrophoresis. In the experiment, the ramsdellite-type manganese dioxide nanoparticle was dispersed ultrasonically for 2 minutes in a $10^{-3}$ mol·L$^{-1}$ KNO$_3$ solution, and after allowing to stand for 5 minutes, the upper layer suspension was collected and diluted with the $10^{-3}$ mol·L$^{-1}$ KNO$_3$ solution to obtain an experimental solution. The pH adjustment employed hydrochloric acid and sodium hydroxide aqueous solutions.

Based on FIG. 8, it was revealed that the surface of the ramsdellite-type manganese dioxide nanoparticle has a tendency to be charged negatively at a pH of 4.8 or higher. This may be due to an increase in the negative electron charge in response to an increase in the OH$^-$ concentration of the water resulting from the activation at pH 4.8 or higher of the catalytic reaction which decomposes the hydroxide ion into the proton, electron and oxygen gas on the surface of the ramsdellite-type manganese dioxide nanoparticle. Consequently, the negative charge may be added to the interfacial potential on the surface of the ramsdellite-type manganese dioxide nanoparticle immersed in an alkaline aqueous solution.

Figure 9:
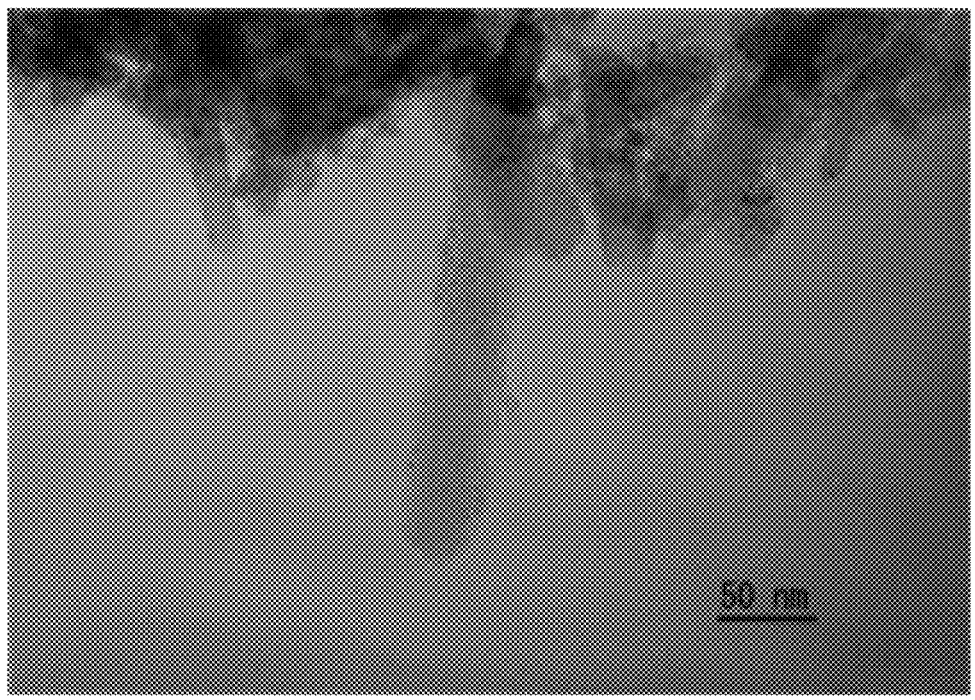
FIG. 9(a) shows a transmission electron microscopic photograph of the R-type manganese dioxide having a metal palladium deposited on the surface thereof b) a result of a binding energy measurement indicating that the valency of the deposited palladium is the state of metallic palladium.
Figure 9:
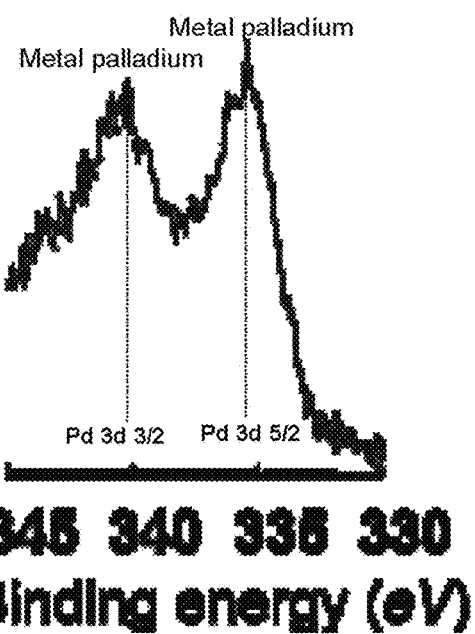

FIG. 9(a) shows a transmission electron microscopic photograph of a state where the palladium hydroxide was deposited as a metal palladium on the surface of the ramsdellite-type manganese dioxide nanoparticle by adding the aforementioned nanoparticle to 200 mL of an aqueous solution of a palladium hydroxide (palladium concentration of 2000 ppm) whose pH was kept at 6. It was confirmed that the precipitated palladium has 0 valency of the metal palladium rather than 2 valency of the palladium hydroxide by an X-ray photoelectron spectroscopy. The results of the measurement of the binding energy as a metal palladium are shown in FIG. 9(b).

Figure 10:
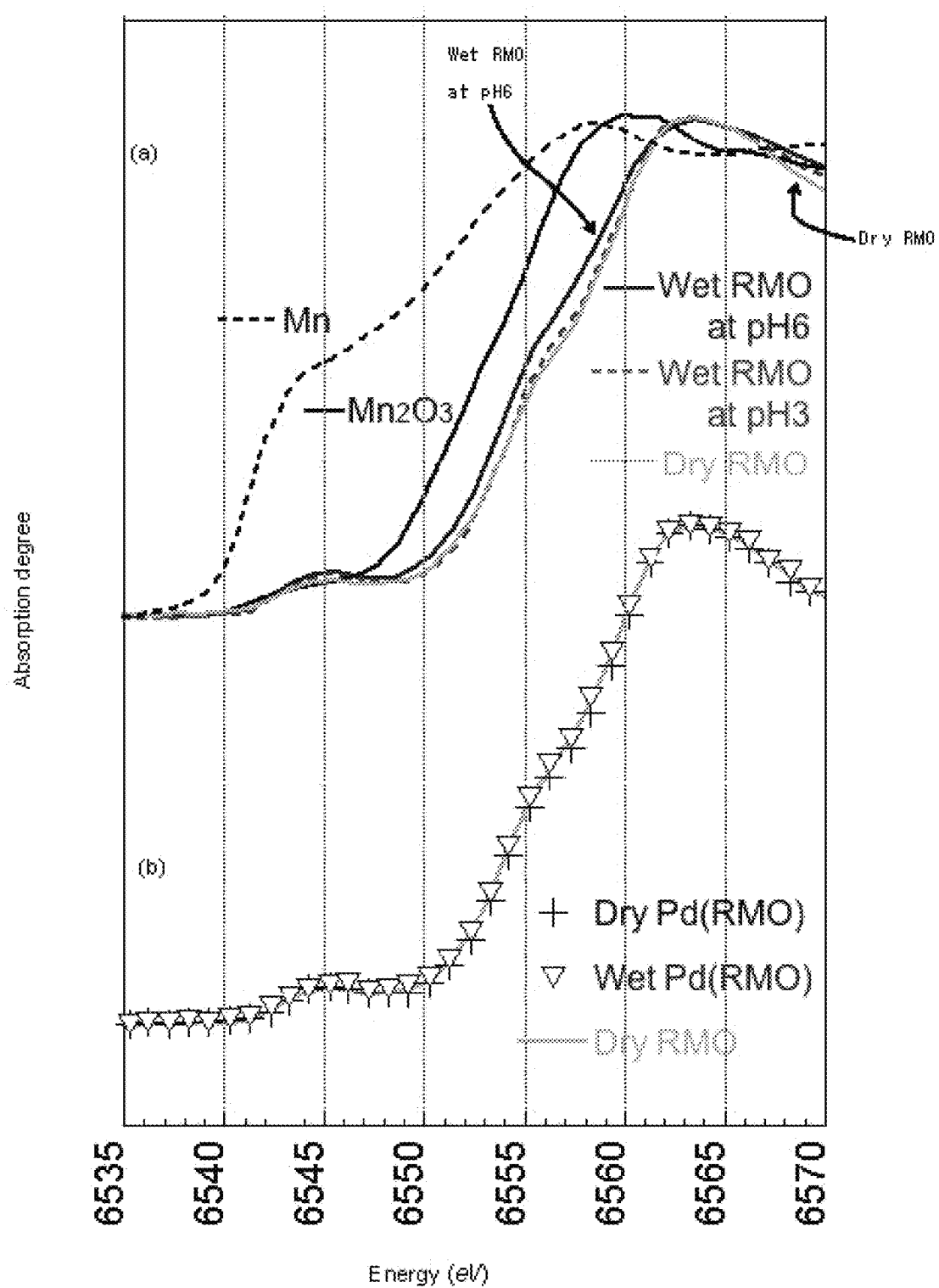
FIG. 10 shows the change in the valency of the manganese in manganese oxides measured by the X-ray absorption near-edge analysis in Example 3.

FIG. 10 shows the change in the valency of the manganese of the ramsdellite-type manganese dioxide employed in the experiment measured by the X-ray absorption near-edge analysis. The figure exhibited, among the group (a), a shift of the absorption edge by about 1 eV which indicate that a trivalent manganese was contained in the nanoparticle (RMO) of the ramsdellite-type manganese dioxide immersed for 2 days in the ion exchange pure water at pH6. This is based on the shift in the direction of Mn$_2$O$_3$ which was the manganese oxide measured as a trivalent manganese standard substance. Nevertheless, no trivalent manganese was detected in the nanoparticle of the ramsdellite-type manganese dioxide immersed for 2 days in the ion exchange pure water at pH3 with the absorption edge being similar to the dry ramsdellite-type manganese dioxide nanoparticle measured as a tetravalent manganese standard substance, and the generation of the electron which induces the change in the manganese valency was not detected in the case of a contact with the water at pH3. Therefore, these results support that the reaction for allowing the function represented by the aforementioned chemical formula (1) to be exerted occurs at pH4.8 or higher.

Also among the group (b), the manganese of the ramsdellite-type manganese dioxide nanoparticle after depositing the metal palladium shown in FIG. 9(a) was tetravalent, indicating that it returned to be tetravalent as a result of releasing an electron thereby reducing the palladium ion Pd$^{2+}$ in the palladium hydroxide. Upon this, even in the state of being wet in the aqueous solution of the palladium hydroxide (plot ∇ in the figure), the valency of the manganese exhibited the tetravalent absorption edge which was in agreement with the dry ramsdellite-type manganese dioxide nanoparticle. Accordingly, it was indicated that the reaction for allowing the palladium ion to be reduced into and deposited as a metal had occurred in the aqueous solution of the palladium hydroxide to which the ramsdellite-type manganese dioxide nanoparticle was added, supporting that this reduction and deposition was not resulting simply from the effect of the drying treatment on the palladium ion which had deposited on the surface of the ramsdellite-type manganese dioxide nanoparticle immersed in the aqueous solution of the palladium. Since such a palladium metal deposition can occur also in an experiment system placed in a dark place, no photocatalytic effect of the ramsdellite-type manganese dioxide nanoparticle is revealed to be involved.

Also when the ramsdellite-type manganese dioxide nanoparticle was added to the aqueous solution of the gold chloride kept at a pH of 4.8 to 9, the similar deposition profile was observed.

Figure 11:
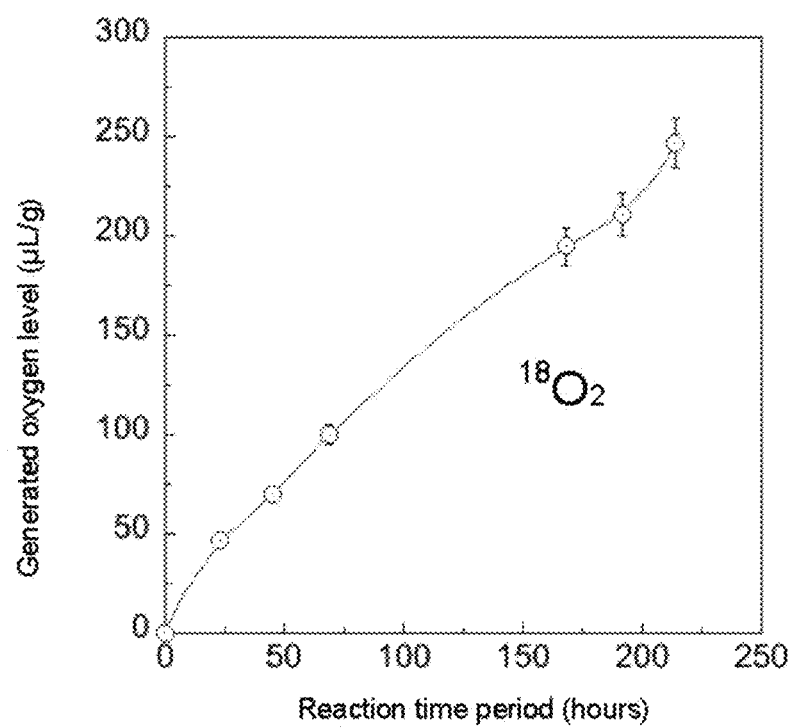
FIG. 11 shows a generation of $^{18}O_2$ from an isotopic water $H_2^{18}O$ in which the R-type manganese dioxide is suspended and the change of $^{18}O_2$ concentration thereof in Example 3.

FIG. 11 indicates that, when 0.05 g of a dry ramsdellite-type manganese dioxide nanoparticle was suspended in 1 mL of an isotopic water H$_2$$^{18}$O (99.7%, Cambridge Isotope Laboratories, Inc.) in a tightly closed container protected from light with an aluminum foil, an oxygen gas $^{18}$O$_2$ which was derived from the hydroxide ion of the isotopic water was detected and its concentration was raised as the time elapsed. The measurement employed a gas chromatograph-mass spectrometer. The initial pH of the isotopic water H$_2$$^{18}$O employed in the experiment was adjusted at 3 by adding a dilute hydrochloric acid. This initial pH was raised to pH6 immediately after suspending a dry ramsdellite-type manganese dioxide nanoparticle, and the pH6 was approximately kept until 215 hours had elapsed when the experiment was completed. 1 mL of the isotopic water $H_2^{18}O$ was sealed tightly and bubbled with a helium gas He(99.99%) for 3 minutes before initiating the experiment thereby allowing any $^{18}O_2$, possibly remaining as being dissolved in the isotopic water, to be purged off. For all of the plotted data in FIG. 11, in order to eliminate the possibility that an argon isotope $^{36}Ar$ contained in the are was leaked into the tightly closed container during the experiment, the concentration of $^{40}Ar$ in the tightly closed container was measured simultaneously thereby obtaining the $^{36}Ar$ leakage level based on the natural isotopic ratio, then the $^{36}Ar$ concentration was subtracted preliminarily from all measured values of $^{18}O_2$ in the figure. This was done because of the reason that since the measurement employed the gas chromatograph-mass spectrometer the $^{36}Ar$ having the mass number identical to that of $^{18}O_2$ should lead to an error.

Figure 12:
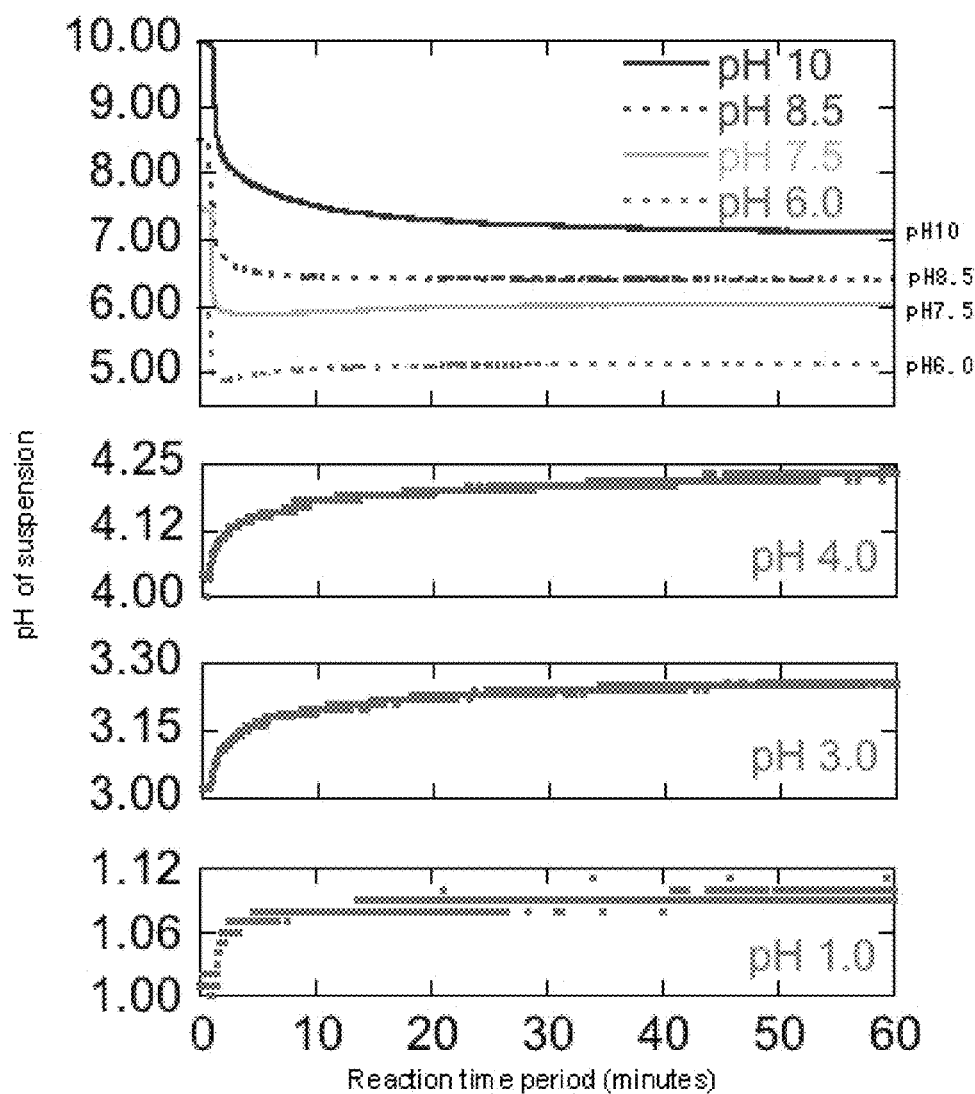
FIG. 12 shows the change in the pH of the water in which the R-type manganese dioxide is suspended in Example 3.

FIG. 12 shows that when 0.2 g of a ramsdellite-type manganese dioxide nanoparticle was suspended in 90 mL of an ion exchange pure water the pH after suspending varied depending on the initial pH. Exceptionally when the initial pH was 1, 2 g of the ramsdellite-type manganese dioxide nanoparticle was suspended in 90 mL of the ion exchange pure water for the purpose of clarifying the change in the pH. The figure shows that in an acidic water, the proton $H^+$ was adsorbed onto the surface of the ramsdellite-type manganese dioxide nanoparticle to give an elevated pH which resulted in the positive charge on the surface of the ramsdellite-type manganese dioxide nanoparticle as indicated by the results of the measurement of the interfacial (zeta) potential in FIG. 8 while allowing the $OH^-$ in the alkaline water to be decomposed to give a negative charge, resulting in a reduced pH.

The aforementioned results indicated in FIG. 8 to FIG. 12 all support the aforementioned reaction schemes (1) and (2), and the palladium deposition reaction shown in FIG. 8 can reasonably be explained as in the following reaction scheme.

[C.3]

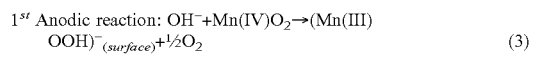

$$1^{st}\ \text{Anodic reaction: } OH^- + Mn(IV)O_2 \rightarrow (Mn(III)OOH)^-_{(surface)} + \tfrac{1}{2}O_2 \quad (3)$$

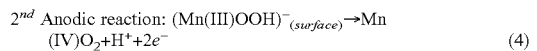

$$2^{nd}\ \text{Anodic reaction: } (Mn(III)OOH)^-_{(surface)} \rightarrow Mn(IV)O_2 + H^+ + 2e^- \quad (4)$$

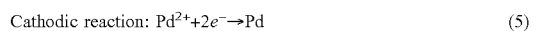

$$\text{Cathodic reaction: } Pd^{2+} + 2e^- \rightarrow Pd \quad (5)$$

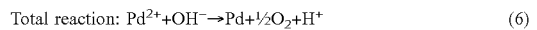

$$\text{Total reaction: } Pd^{2+} + OH^- \rightarrow Pd + \tfrac{1}{2}O_2 + H^+ \quad (6)$$

In the reaction scheme, the subscript "surface" indicates the chemical composition of the surface of the nanometer-sized manganese dioxide having the ramsdellite-type crystal structure.

Since the Gibbs free energy relating to these reactions can be calculated as $\Delta G = -38.64K\ Jmol^{-1}$, the reactions can be said to be advanced with the aid of the ramsdellite-type manganese dioxide nanoparticle as a catalyst.

The invention claimed is:

1. A method for synthesizing a manganese dioxide comprising a series of wet multistage oxidation process comprising: Step 1 for adding an alkaline reagent to an aqueous solution of a manganese compound containing a divalent manganese thereby precipitating a manganese hydroxide; Step 2 for adding an aqueous hydrogen peroxide while keeping the temperature of the water of said aqueous solution at room temperature thereby converting said manganese hydroxide into a manganese oxide; and Step 3 for adding a dilute acid to said manganese oxide in a state where the water is coexisting thereby obtaining a nanometer-sized manganese dioxide having a ramsdellite-type crystal structure.

2. The method for synthesizing a manganese dioxide according to claim 1 wherein the compound containing the divalent manganese is a manganese chloride or a manganese sulfate.

3. A method for synthesizing a manganese dioxide comprising, after completing Step 3 of claim 1, adding another aqueous solution of a manganese compound containing a divalent manganese to said nanometer-sized manganese dioxide and heating.

4. The method for synthesizing a manganese dioxide according to claim 3 wherein the another aqueous solution of a manganese compound containing a divalent manganese is acidic.

5. The method for synthesizing a manganese dioxide according to claim 3 wherein the compound containing the divalent manganese in the another aqueous solution is a manganese chloride or a manganese sulfate.

6. A method for producing a hydroxide ion-derived proton comprising the following steps:
   (1) a step for adding an alkaline reagent to an aqueous solution of a manganese compound containing a divalent manganese thereby allowing a manganese hydroxide to be precipitated;
   (2) a step for adding an aqueous hydrogen peroxide while keeping the temperature of the water of said aqueous solution at room temperature thereby converting said manganese hydroxide into a manganese oxide;
   (3) a step for adding a dilute acid to said manganese oxide in a state where the water is coexisting thereby obtaining a nanometer-sized manganese dioxide having a ramsdellite-type crystal structure; and,
   (4) a step for placing said manganese dioxide from step (3) in a water thereby producing a proton from a hydroxide ion contained in the water.

7. The method for producing a hydroxide ion-derived proton according to claim 6 wherein the pH of the water of step (4) is within the range of 4.5 to 10.

8. A method for charging a hydroxide ion-derived electron comprising the following steps:
   (1) a step for adding an alkaline reagent to an aqueous solution of a manganese compound containing a divalent manganese thereby allowing a manganese hydroxide to be precipitated;
   (2) a step for adding an aqueous hydrogen peroxide while keeping the temperature of the water of said aqueous solution at room temperature thereby converting said manganese hydroxide into a manganese oxide;
   (3) a step for adding a dilute acid to said manganese oxide in a state where the water is coexisting thereby obtaining a nanometer-sized manganese dioxide having a ramsdellite-type crystal structure; and,
   (4) a step for placing said manganese dioxide from step (3) in a water thereby allowing a hydroxide ion-derived electron contained in the water to be charged on a surface of said manganese dioxide.

9. The method for charging a hydroxide ion-derived electron according to claim 8 wherein the pH of the water of step (4) is within the range of 4.5 to 10.

10. A method for producing a hydroxide ion-derived oxygen comprising the following steps:

(1) a step for adding an alkaline reagent to an aqueous solution of a manganese compound containing a divalent manganese thereby allowing a manganese hydroxide to be precipitated;

(2) a step for adding an aqueous hydrogen peroxide while keeping the temperature of the water of said aqueous solution at room temperature thereby converting said manganese hydroxide into a manganese oxide;

(3) a step for adding a dilute acid to said manganese oxide in a state where the water is coexisting thereby obtaining a nanometer-sized manganese dioxide having a ramsdellite-type crystal structure; and, (4) a step for placing said manganese dioxide from step (3) in a water thereby producing an oxygen gas from a hydroxide ion contained in the water.

11. The method for producing a hydroxide ion-derived oxygen according to claim 10 wherein the pH of the water of step (4) is within the range of 4.5 to 10.

12. A method for recovering a noble metal ion from a water comprising the following steps:

(1) a step for adding an alkaline reagent to an aqueous solution of a manganese compound containing a divalent manganese thereby allowing a manganese hydroxide to be precipitated;

(2) a step for adding an aqueous hydrogen peroxide while keeping the temperature of the water of said aqueous solution at room temperature thereby converting said manganese hydroxide into a manganese oxide;

(3) a step for adding a dilute acid to said manganese oxide in a state where the water is coexisting thereby obtaining a nanometer-sized manganese dioxide having a ramsdellite-type crystal structure; and, (4) a step for adjusting the pH of an aqueous solution containing a noble metal, to which the manganese dioxide from step (3) is added, to pH 4.5 to 10, thereby allowing a noble metal ion in the aqueous solution to be deposited as a metal on a surface of said manganese dioxide.

13. A method for synthesizing a manganese dioxide comprising, after completing Step 3 of claim 2, adding another aqueous solution of a manganese compound containing a divalent manganese to said nanometer-sized manganese dioxide and heating.

14. The method for synthesizing a manganese dioxide according to claim 13 wherein the another aqueous solution of a manganese compound containing a divalent manganese is acidic.

15. The method for synthesizing a manganese dioxide according to claim 13 wherein the compound containing the divalent manganese in the another aqueous solution is a manganese chloride or a manganese sulfate.

16. The method for synthesizing a manganese dioxide according to claim 4 wherein the compound containing the divalent manganese in the another aqueous solution is a manganese chloride or a manganese sulfate.

17. The method for synthesizing a manganese dioxide according to claim 14 wherein the compound containing the divalent manganese in the another aqueous solution is a manganese chloride or a manganese sulfate.

* * * * *